No. 679,399. Patented July 30, 1901.
J. SMITH & R. WALKER.
WALL SOCKET FOR WATER OR OTHER PIPES.
(Application filed May 6, 1901.)
(No Model.)
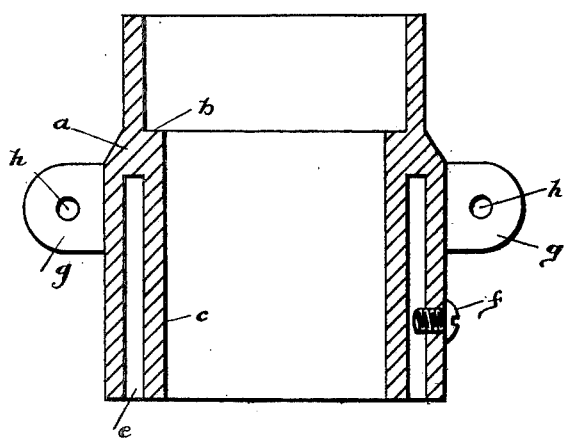
Fig. 1.
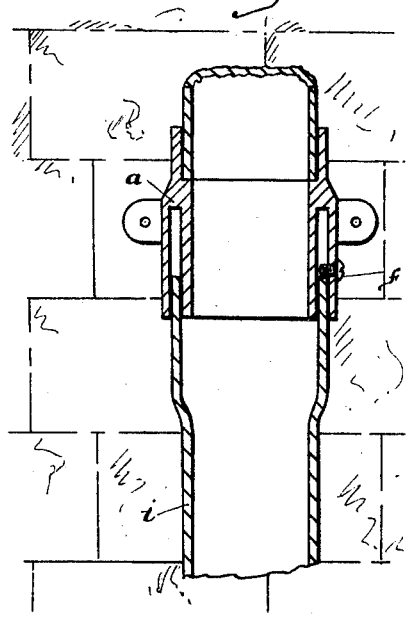
Fig. 2.
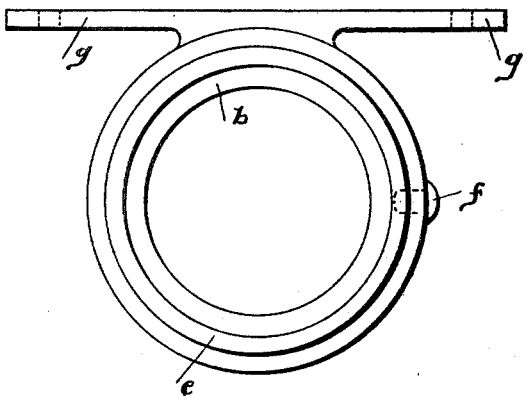
Fig. 3.
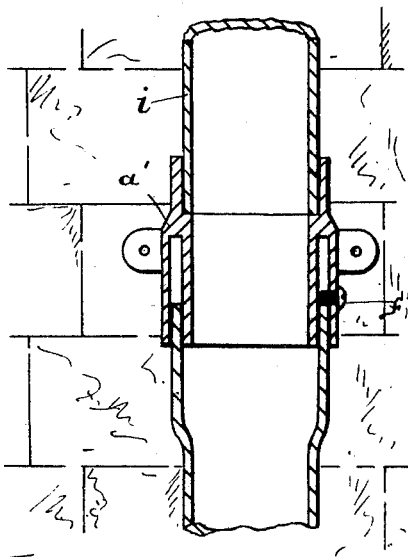
Witnesses.
Benjamin Clark
Charles H. Bragg
Inventors.
John Smith and
Robert Walker.
Per:— E. Eaton.
Their Attorney.
THE NORRIS PETERS CO., PHOTO-LITHO., WASHINGTON, D. C.

UNITED STATES PATENT OFFICE.

JOHN SMITH AND ROBERT WALKER, OF SOUTH SHIELDS, ENGLAND.

WALL-SOCKET FOR WATER OR OTHER PIPES.

SPECIFICATION forming part of Letters Patent No. 679,399, dated July 30, 1901.

Application filed May 6, 1901. Serial No. 58,992. (No model.)

*To all whom it may concern:*

Be it known that we, JOHN SMITH and ROBERT WALKER, subjects of the King of Great Britain, and residents of South Shields, in the county of Durham, England, have invented certain new and useful Improvements in Wall-Sockets for Water or other Pipes, (for which we have applied for a patent in Great Britain, No. 23,004, dated December 14, 1900,) of which the following is a full, clear, and exact specification.

This invention relates to improvements in wall-sockets for water or other pipes, the object being to facilitate the fixing or renewal of such pipes when required.

For purposes of illustration we will now refer to the annexed drawings.

Figure 1 is a sectional elevation through our improved wall-socket. Fig. 2 is a sectional elevation, to a reduced scale, showing two of our sockets with a length of water or other pipe in position against a wall. Fig. 3 is a plan view of Fig. 1.

The wall-socket $a$ is provided at its upper part with an internal ridge or projection $b$ in order that the lower end of a water or other pipe may rest thereon, its lower part being provided with an inner sleeve $c$, thus leaving a space or recess $e$ between same and the outer casing of the socket $a$, into which the upper end of a water or other pipe may be inserted. A stop-pin or the like $f$ is screwed into the outer casing of the socket $a$, as shown, and must be withdrawn when a length of pipe is required to be renewed. Lugs $g$, having holes $h$ therein, are cast or otherwise formed with the socket in order that same may be readily attached or fixed upon a wall or other position by means of nails or the like.

Referring to Fig. 2, it will be seen that by means of the stop-pin $f$ the upper end of the water or other pipe $i$ is prevented from entering too far into the space or recess $e$; but if the pipe $i$ is required to be renewed the pin $f$ is withdrawn from the socket $a$, and the upper end of the pipe $i$ may then be farther inserted into the space or recess $e$, so allowing the lower end of the pipe $i$ to be withdrawn from the socket $a'$, and the pipe $i$, fitting loosely into the socket $a$, may then be withdrawn and a new length or section of pipe placed in position.

The socket may be of any suitable shape or size in cross-section, according to the shape and size of the water or other pipe in use.

Having thus described our invention, what we claim, and desire to secure by Letters Patent, is—

In wall-sockets for water and other pipes, an inner sleeve, in the space between which and the outer casing, the upper end of the lower pipe is held, an internal ridge or projection to receive the lower end of the upper pipe, a set-screw or stop-pin for adjusting the distance between the sockets, substantially as described and illustrated herein and for the purpose set forth.

In testimony that we claim the foregoing invention we have hereunto set our hands this 12th day of February, 1901.

JOHN $\overset{\text{his}}{\times}$ SMITH.
$\phantom{JOHN }$mark
ROBERT WALKER.

Witnesses:
 THOMAS ROSS,
 JOHN EDWARD KENT.